United States Patent

[11] 3,604,074

| [72] | Inventor | Irwin J. Bambas |
| | | Westchester, Ill. |
| [21] | Appl. No. | 56,615 |
| [22] | Filed | July 20, 1970 |
| [45] | Patented | Sept. 14, 1971 |
| [73] | Assignee | Du Page Manufacturing Company |
| | | Downers Grove, Ill. |

[54] WORM DRIVE HOSE CLAMP
3 Claims, 5 Drawing Figs.

[52] U.S. Cl. .................................................. 24/274 R
[51] Int. Cl. .............................................. B65d 63/00
[50] Field of Search ........................................ 24/274

[56] References Cited
UNITED STATES PATENTS

| 2,384,094 | 9/1945 | Jamie | 24/274 |
| 2,571,659 | 10/1951 | Bergstrom | 24/274 |
| 3,087,220 | 4/1963 | Tinsley | 24/274 |

*Primary Examiner*—Donald A. Griffin
*Attorney*—Norman H. Gerlach

ABSTRACT: A worm drive hose clamp having a hose-engaging saddle which reinforces the worm housing and also offers frictional characteristics which prevents rotational slippage of the clamp during installation thereof on a hose connection.

PATENTED SEP 14 1971 3,604,074
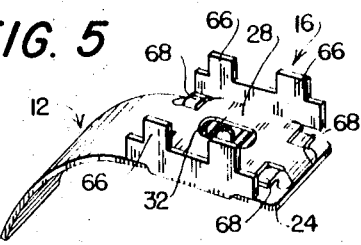
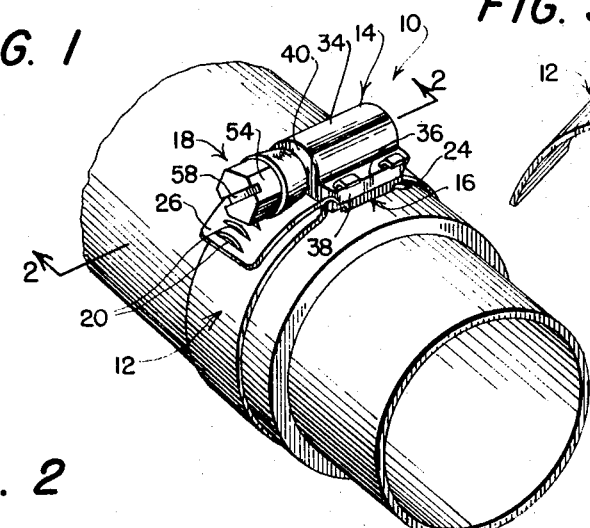
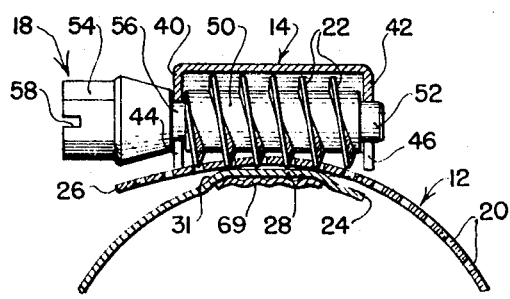
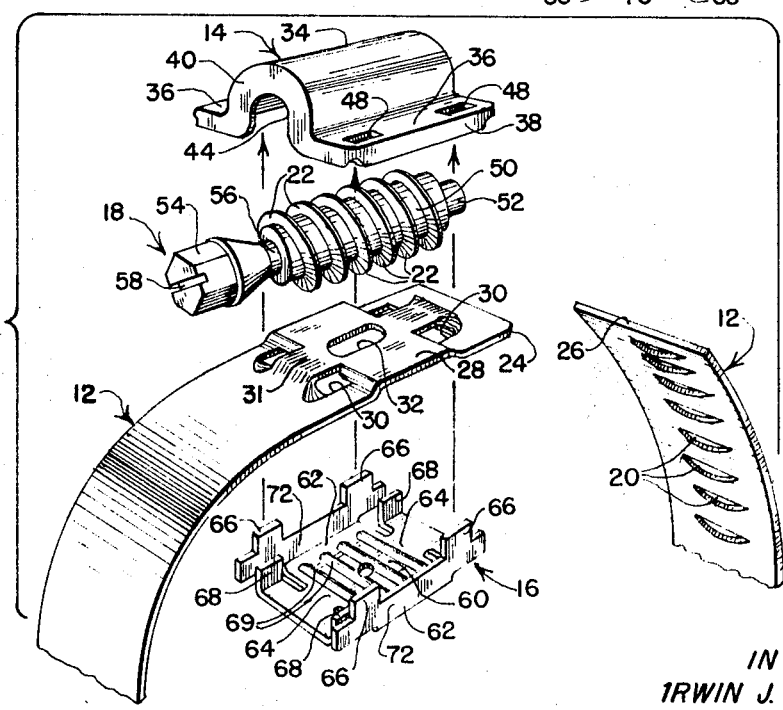
INVENTOR
IRWIN J. BAMBAS
By: *[signature]*
Atty.

WORM DRIVE HOSE CLAMP

The present invention relates to a hose clamp of the type which is commonly employed in the automotive industry for the coupling of hose connections to radiators, engine blocks, power steering and power brake apparatuses, water pumps and the like and wherein the opposite ends of a flexible clamping band are adapted to be acted upon by a freely rotatable worm in such a manner that the band may be contracted about a hose connection and centripetal force thus applied to the hose connection to retain the latter in coextensive sealing engagement with a cylindrical pipe or flange in order to establish a fluid tight connection therewith. One example of such a hose clamp is illustrated and describe in U.S. Pat. No. 3,087,220, granted on Apr. 30, 1963 and entitled "Worm Drive Hose Clamp," the present clamp being designed as an improvement on the clamp of said patent.

The hose clamp of the aforementioned patent comprises four coacting elements, namely, a flexible clamping band, a worm, and a rigid two-part housing consisting of a lower hose-engaging saddle part and an upper worm-enclosing cap part, the two parts being rigidly connected together by interlocking tongues and slots. The hose clamp of the present invention is similarly constructed and embodies the same functional parts, the worm and the upper worm-enclosing cap part remaining substantially the same as in the patented clamp, but the lower hose-engaging saddle part and the clamping band being of improved construction and offering certain advantages which are not attained in the worm drive hose clamp of said patent.

The principal advantage of the improved lower hose-engaging saddle part and the clamping band of the present hose clamp resides in a rigidification of the rigid two-part housing as a whole so as to afford an increase in the torque to which the worm may be subjected when tightening the hose clamp about a hose connection without rupturing or distorting the housing. Experience has shown that the torque-limiting factor which is associated with the earlier hose clamp is the rigidity of the two-part housing rather than the strength of the threads which are associated with and formed in the clamping band. Such threads rarely become stripped or buckled and long before the limit of their strength is reached the two-part housing of the clamp will collapse due to lack of rigidity of the lower hose-engaging saddle part. In the earlier patented hose clamp, said lower hose-engaging saddle part is of uniformly curved construction and when the torque rating of the clamp is exceeded there is a tendency for said lower saddle part to straighten out under the influence of tensional forces which are applied thereto by the various walls of the housing and, thus, the tongues break loose from their respective slots. Another limitation that is attendant upon the construction and use of the earlier hose clamp resides in the tendency for slippage of the clamp as a whole in a circumferential direction under the influence of the tangential force which is applied to the clamp by the screwdriver at the commencement of tightening operations and up until the time that adequate centripetal shrinking or contraction of the clamping band is attained to hold the clamp and prevent such circumferential turning thereof. This circumferential turning slippage is particularly annoying to a mechanic who, as he commences the tightening operation, is obliged to hold the clamp while he applies pressure to the screwdriver, or alternatively, to apply only light forward thrust on the screwdriver until the clamping band has firmly seized the hose connection to which it is being applied. Such lack of forward thrust on the screwdriver frequently leads to slippage of the distal end of the latter from the kerf in the head of the worm.

The present invention is designed to overcome the above-noted limitations that are attendant upon the construction and use of the earlier patented hose clamp, and toward this end, the invention contemplates the provision of a hose clamp in which the lower hose-engaging saddle part of the two-part housing is neither curved nor smooth, but instead, is generally planar except for the provision therein of a series of transverse corrugations. Because the saddle part of the housing is generally flat as contradistinguished from the former curved saddle part, it resists tension when the upper worm-enclosing cap part to which it is attached is placed under stress. Although the corrugations in the saddle part theoretically are subject to straightening when the saddle part is placed under tension, their extremely small radii of curvature resists such straightening out. Furthermore, the transverse corrugations which are provided in the saddle part offer high frictional characteristics to the resilient hose connection with which they come into contact so that as soon as any degree of forcible contraction for shrinking of the clamping band on the hose connection takes place, circumferential turning or slippage of the clamp as a whole is resisted. This resistance to circumferential slippage of the clamp on the hose connection is particularly advantageous when an oil-coated or wet hose connection is encountered.

The provision of a hose clamp such as has briefly been outlined above constitutes the principal object of the present invention. Other objects and advantages of the invention will readily suggest themselves as the nature of the invention is better understood from a consideration of the following detailed description.

The invention consists in the several novel features which are hereinafter set forth and are more particularly defined by the claims at the conclusion hereof.

In the accompanying single sheet of drawings forming a part of this specification, one illustrative embodiment of the invention is shown.

In these drawings:

FIG. 1 is a fragmentary perspective view of a worm drive hose clamp embodying the principles of the present invention and showing the same operatively installed on a hose connection;

FIG. 2 is a sectional view taken on the plane indicated by the line 2—2 of FIG. 1 and in the direction of the arrows;

FIG. 3 is an exploded perspective view of the lower hose-engaging saddle part of the two-part housing, the flexible clamping band, the worm, and the upper worm-enclosing cap part of the housing showing these elements in their oriented positions immediately prior to assembly operations;

FIG. 4 is a plan view of the stamped metal blank from which the upper saddle part of the two-part housing is formed; and FIG. 5 is a fragmentary perspective view of the assembled saddle part and the clamping band prior to installation thereon of the worm and the cap part of the two-part housing.

Referring now to the drawings in detail and in particular to FIG. 1, a hose clamp according to the principles of the present invention is designated in its entirety by the reference numeral 10 and involves in its general organization four principal elements or components, namely, a clamping band 12, an upper worm-enclosing cap part 14, a lower hose-engaging saddle part 16, and a worm 18. The upper and lower parts 14 and 16, when assembled upon each other and upon one end of the band 12, constitute a composite or two-part housing within which the worm 18 is disposed and within which the worm is rotatable about its longitudinal axis. A two-part worm housing of this character is known in the art and the upper housing part is commonly referred to as the cap part, while the lower housing part is referred to as the saddle part, as heretofore mentioned. Such terminology will be employed hereafter in the specification, as well as in the appended claims.

The clamping band 12 of the hose clamp 10 is in the form of an elongated flexible strip of resilient sheet metal stock, preferably tempered stainless steel, the strip being of uniform width. It is formed with a plurality of equally spaced openings 20 which are cut or punched therein at such an angle as to form teeth which cooperate with the threads 22 of the band-tightening worm 18. The spaced openings extend inwardly from one end of the band 12 a sufficient distance longitudinally of the band that the latter may be employed in connection with hose connections of widely varying diameters although it is preferable that the band be of a length which will accommodate a limited range of diameters.

The end of the band which is designated by the reference numeral 24 is fixed with respect to the two-part housing, while the other end 26 thereof is slidable with respect to the housing for band contraction and expansion purposes in a manner that will be made clear presently. As best illustrated in FIG. 3, the fixed end 24 of the clamping band 12 is provided with an upwardly offset portion 28. The latter is planar and fits against a portion of the lower saddle part 16, as will be described presently. On each side of the offset portion 28 of the clamping band there is provided a pair of punched slots 30 (see FIG. 3) and these are separated by a raised portion 31. Said slots 30 extend longitudinally of the clamping band 12 as best shown in FIG. 3. The offset portion 28 is formed with a medially disposed slot 32 which extends lengthwise of the band. The purpose of the slots 30 and 32 will be made clear subsequently.

The cap part 14 of the two-part housing is of unitary rigid boxlike construction and is preferably in the form of a sheet metal stamping which, in its finished form, comprises a generally semicylindrical top wall 34, the lower side margins of which are turned laterally outwardly as at 36 and then downwardly as at 38 to provide a pair of side walls. The housing cap part 14 is also provided with front and rear end walls 40 and 42 which are provided with central downwardly opening notches 44 and 46, respectively, for worm-journaling purposes. The laterally turned side regions 36 of the housing cap part 14 are formed with slots 48 for reception of certain hereinafter mentioned tongues on the saddle part 16.

The worm 18 is provided with an enlarged body portion 50 upon which the threads 22 are formed. A short cylindrical stem 52 is integrally formed on one end of the body portion 50 and projects axially outwardly through the notch 46 in the end wall 42 of the cap part 14. The worm body portion 50 is provided at its other end with an enlarged head 54 which is separate from the body portion 50 by a narrow annular groove 56, this groove being straddled by the side edges of the notch 44 in the end wall 40 of the two-part housing. The head 54 is provided with a diametric kerf 58 in the outer end face thereof and such kerf is designed to receive therein the operative end of a screwdriver or similar turning tool (not shown) by means of which the worm 18 of the hose clamp may be rotated in one direction or the other.

The fixed end region 24 of the clamping band 12 is interposed between the housing cap part 14 and the saddle part 16. The latter is generally of spiderlike design and includes a central generally rectangular body portion 60 from which there extends laterally a pair of arms 62 and from which there also extends longitudinally a pair of arms 64. The laterally extending arms 62 are provided along their outer margins with respective pairs of upstanding tongues 66 while the longitudinally extending arms 64 are provided at their end regions with respective pairs of upstanding tongues 68. The tongues 66 are designed for reception in the slots 48 in the side regions 36 of the housing cap part of the composite housing while the tongues 68 are designed for reception in the slots 30 in the fixed end region of the clamping band 12. The body portion 60 is generally planar except for the provision of a series of transversely extending corrugations 69 which extend completely across the body portion and project a short distance into each of the laterally extending arms 62. This body portion is adapted to fit against the flat underneath surface of the offset portion 28 of the clamping band 12. The distance between the two pairs of upstanding tongues 66 is slightly greater than the width of the clamping band 12 so that these tongues will straddle the side edges of the band when the two housing parts 14 and 16 are assembled.

The saddle part 16 is in the form of a sheet metal stamping and the blank from which said part is formed is shown in detail in FIG. 4. As shown in this particular figure of the drawings, the tongues 68 are bent upwardly out of the plane of the blank at the outer ends of the arms 64 along bend lines indicated in dotted lines at 74. The laterally extending arms 62 are provided with enlargements 72 at their outer ends and the tongues 66 lie in the plane of such enlargements so that when the latter are bent upwardly out of the plane of the body portion as shown in FIG. 3 along bend lines indicated at 70 in dotted lines, the tongues 66 will automatically assume vertical or upstanding positions.

In the assembly of the four component parts of the hose clamp 10, as best illustrated in FIG. 3, the upstanding tongues 68 are passed upwardly through the four slots 30 in the fixed end region 24 of the clamping band 12, while the corrugated body portion 60 of the saddle 16 is caused to nest within the recess which is established by the upwardly offset portion 28 of the band 12. Thereafter, the tongues 68 are bent laterally outwardly and flattened upon the upper surface or side of the fixed end region of the clamping band 12 in order to hold the saddle part 16 and the clamping band in their assembled relationship as shown in FIG. 5. The worm 18 may then be positioned within the housing cap part 14 of the composite or two-part housing so that the stem 52 thereof extends through the notch 46 and the slot 44 straddles the reduced portion of the worm which is afforded by the annular groove 56, and so that the body portion 50 of the worm is substantially wholly disposed within the confines of the housing cap part 14. With the worm 18 thus in position within the housing cap part 14, the previously assembled saddle part and band are brought into juxtaposition with respect to the housing cap part and the tongues 66 are passed upwardly through the slots 48 and, thereafter, these tongues are bent outwardly as shown in FIG. 1 in order securely to lock the housing cap part 14 in position on the saddle part 16, and thus, complete assembly of the clamp as a whole. Finally, the movable end region 26 of the clamping band 12 is threaded through the two-part housing as shown in FIG. 2 so that the teeth-forming openings 20 are caused to register with the threads 22 of the worm 18.

In the operation of the herein described hose clamp, if one end of the hose connection to be clamped is accessible, the assembles clamp is telescopically positioned about the hose connection, the latter secured to the flange or other terminal to which it is to be applied, and the clamp-tightening operation initiated by inserting the operating end of a screwdriver into the kerf 58 of the worm 18 in the usual manner of clamp-tightening operations. If the hose connection is already in place and it is not desired to remove the same for clamp application purposes, the movable end region 26 of the clamping band 12 is withdrawn from the housing by rotating the worm in a counterclockwise direction, after which the band may be caused to encircle the hose connection and the movable end region 26 again restored to the housing. Thereafter, rotation of the worm in a clockwise direction will effect contraction or shrinking of the loop which is formed by the band. It is to be particularly noted that during the band-tightening operation, as soon as the corrugated saddle part 16 comes to rest on the hose connection and a small amount of torque is applied to the worm, the frictional characteristics which are offered by the corrugations 69 inhibit any tendency for the band to slip circumferentially under the influence of forward pressure on the worm by the screwdriver. Thereafter, each increment of turning movement which is applied to the worm 18 effects a uniform increment of band shrinking with a rapid rise in the frictional characteristics which is exhibited by the corrugations 69 as they bite into the resilient material of the hose connection. Thus, even though the operator may find it necessary to exert a considerable forward thrust on the worm 18 by the screwdriver, there will be no tendency for the band to slip circumferentially and the necessity of manually holding the clamp during initial band-tightening operations is avoided. Further than this, the corrugations 69 rigidify the housing as a whole and materially increase the torque limit which the band is capable of assimilating.

The invention is not to be limited to the exact arrangement of parts shown in the accompanying drawings or described in this specification as various changes in the details of construction may be resorted to without departing from the spirit or scope of the invention.

Having thus described the invention what I claim as new and desire to secure by Letters Patent is:

1. A hose clamp comprising, in combination, an elongated clamping band for encircling a hose connection and having formed therein a series of spaced openings defining a series of teeth, a rigid open-ended boxlike housing having a curved top wall, spaced sidewalls, a front wall, a rear wall, and a bottom wall, one end region of said band projecting endwise into said housing and being fixedly secured to said bottom wall, the other end region of the band projecting normally into the housing in reentrant fashion and in overlapping relation to the fixed end region of the band, and being slidable thereover for band-tightening purposes, a band-tightening worm projecting lengthwise through the housing and having its opposite ends rotatable in said front and rear walls, said worm having a screw-threaded portion intermediate its ends and in the space within the housing between said top wall and the slidable portion of the band and engageable with the teeth on the band, said bottom wall being formed with a series of transversely extending corrugations thereacross for rigidifying the housing against the reaction force of the worm and for preventing circumferential shifting of the band during application of torque to the worm.

2. A hose clamp assembly as set forth in claim 1 and wherein said bottom wall of the housing is substantially planar except for the corrugations therein.

3. A hose clamp assembly as set forth in claim 2 and wherein said one end region of the band is provided with a planar portion which closely overlies said corrugated substantially planar bottom wall of the housing.